United States Patent
Lambert

(12) 
(10) Patent No.: US 6,363,649 B1
(45) Date of Patent: Apr. 2, 2002

(54) METHOD AND APPARATUS FOR SHED ANTLER REMOVAL AND COLLECTION

(76) Inventor: Gary W. Lambert, P.O. Box 10932, Kalispell, MT (US) 59904

(*) Notice: Subject to any disclaimer, the term of this patent is extended or adjusted under 35 U.S.C. 154(b) by 0 days.

(21) Appl. No.: 09/771,154

(22) Filed: May 14, 2001

Related U.S. Application Data

(60) Provisional application No. 60/198,770, filed on Apr. 21, 2000.

(51) Int. Cl.$^7$ .............................................. A01M 23/00
(52) U.S. Cl. ............................................... 43/1; 119/96
(58) Field of Search ................................ 119/801, 502, 119/729; 434/295, 296; 43/107, 108, 1; 47/24

(56) References Cited

U.S. PATENT DOCUMENTS

| | | | |
|---|---|---|---|
| 1,572,982 A | * | 2/1926 | Barger et al. |
| 4,498,425 A | * | 2/1985 | Aanestad ...................... 119/96 |
| 6,026,766 A | * | 2/2000 | Albers, Jr. .................. 119/520 |

* cited by examiner

Primary Examiner—Charles T. Jordan
Assistant Examiner—Bethany L. Griles

(74) Attorney, Agent, or Firm—Burkhart & Burkhart; Patrick N. Burkhart; Anne K. Burkhart

(57) ABSTRACT

An antler removal and collection device includes an antlered animal attractant holder adapted and constructed to hold an antlered animal attractant. The device also includes a flexible antler removal assembly mounted in proximity with the antlered animal attractant holder, the flexible antler removal assembly including at least one elastic antler removal element. The at least one elastic antler removal element is adapted and constructed to exert sufficient force to remove antlers that are ready to be shed by animals coming into proximity with the antlered animal attractant, but insufficient force to trap the antlered animal in the flexible antler removal assembly. The flexible antler removal assembly can include at least one frame assembly upon which the at least one elastic antler removal element is mounted. In an embodiment, the at least one frame assembly is provided as a pair of frame assemblies and a corresponding pair of elastic antler removal elements. Each of the frame assemblies can include an upper arm mounted above the antlered animal attractant holder, and a retaining hook mounted below the upper arm. The elastic antler removal elements can be configured as a plurality of elastic strap members connected between the upper arm and retaining hooks of the frame assemblies. In an alternative embodiment, the frame assembly are provided as a pair of generally concentric rings mounted to a feeding device.

20 Claims, 4 Drawing Sheets

METHOD AND APPARATUS FOR SHED ANTLER REMOVAL AND COLLECTION

This application claims the benefit of provisional application 60/198770, filed Apr. 21, 2000.

FIELD OF THE INVENTION

The present invention relates generally to the removal and collection of shed antlers from antlered animals. Specifically, the present invention relates to a method and apparatus for removing shed antlers from antlered animals while minimizing the risk of damage to the animals themselves.

BACKGROUND OF THE INVENTION

According to the North American Shed Hunter's Club, the human urge to collect animal parts such as hides, skulls, teeth, leg bones, horns and antlers dates from the dawn of human history. The cave walls of Lasceaux document the hunt for animals, particularly antlered animals, by early man. Consumption of animals, then, was primarily for survival, while the by-products were used for personal adornment or as ornamental pieces to recognize successful hunts.

While hunting remains a popular pastime, the popularity of collecting naturally shed big game antlers, such as those shed by whitetail deer, mule deer, elk, and other antlered species, is increasing phenomenally.

Shed antlers are a natural, renewable and recyclable big game "by-product." Once antlers are shed from their host, they are a natural by-product which deteriorates into the soil. Once collected, shed antlers are put to myriad uses. Antlers are used in the traditional medical practices of many cultures. They are used as decorative elements in lamps, furnishings, architecture, and other products. Hunters typically use shed antlers to "rattle in" game during hunting season. The demand for antlers is ever-increasing due to these exemplary uses and many others.

The collection of shed antlers is a non-consumptive sport, of which it has been said that "looking for naturally shed antlers is much like hunting for more mushrooms in the spring, or wild berries in the summer." Traditional methods of shed hunting involve scouting, tracking, perseverance, and not a little luck. While the general season of antler shedding is a particular region may be known, it is impossible to predict the precise time and location at which a particular animal will shed its antlers. Tracking an animal such as, for example, a bull elk, in order to catch even a fleeting glimpse is a difficult and time-consuming task. To track such an animal for perhaps weeks at a time during shed season, hoping to be present at the precise moment of shedding, would be prohibitively difficult at best.

In many areas, it is common to provide feeders, or other attractants such as salt licks, for antlered game animals. In these instances, it has been known to position chicken wire in a generally funnel-shaped configuration in hopes of dislodging antlers about to be shed. Unfortunately, this practice has proven to have limited effectiveness. Worse, animals frequently are trapped in the chicken wire, with the result that the animal is badly injured or killed.

It can be seen that the need exists for a simple, inexpensive, method and apparatus for effectively removing shed antlers from antlered animals at a predictable location while minimizing the risk of damage to the animals themselves.

SUMMARY OF THE INVENTION

These and other objects are achieved by providing an antler removal and collection device including an antlered animal attractant holder adapted and constructed to hold an antlered animal attractant. The device also includes a flexible antler removal assembly mounted in proximity with the antlered animal attractant holder, the flexible antler removal assembly including at least one elastic antler removal element. The at least one elastic antler removal element is adapted and constructed to exert sufficient force to remove antlers that are ready to be shed by animals coming into proximity with the antlered animal attractant, but insufficient force to trap the antlered animal in the flexible antler removal assembly.

The flexible antler removal assembly can include at least one frame assembly upon which the at least one elastic antler removal element is mounted. In an embodiment, the at least one frame assembly is provided as a pair of frame assemblies and a corresponding pair of elastic antler removal elements. Each of the frame assemblies can include an upper arm mounted above the antlered animal attractant holder, and a retaining hook mounted below the upper arm. The elastic antler removal elements can be configured as a plurality of elastic strap members connected between the upper arm and retaining hooks of the frame assemblies.

In an alternative embodiment, the frame assembly are provided as a pair of generally concentric rings mounted to a feeding device. The elastic antler removal elements can be provided as a plurality of elastic strap members connected between the rings of the frame assembly, or alternatively as a generally frustoconical net connected between the rings of the frame assembly.

The features of the invention believed to be patentable are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE INVENTION

Figure 1:
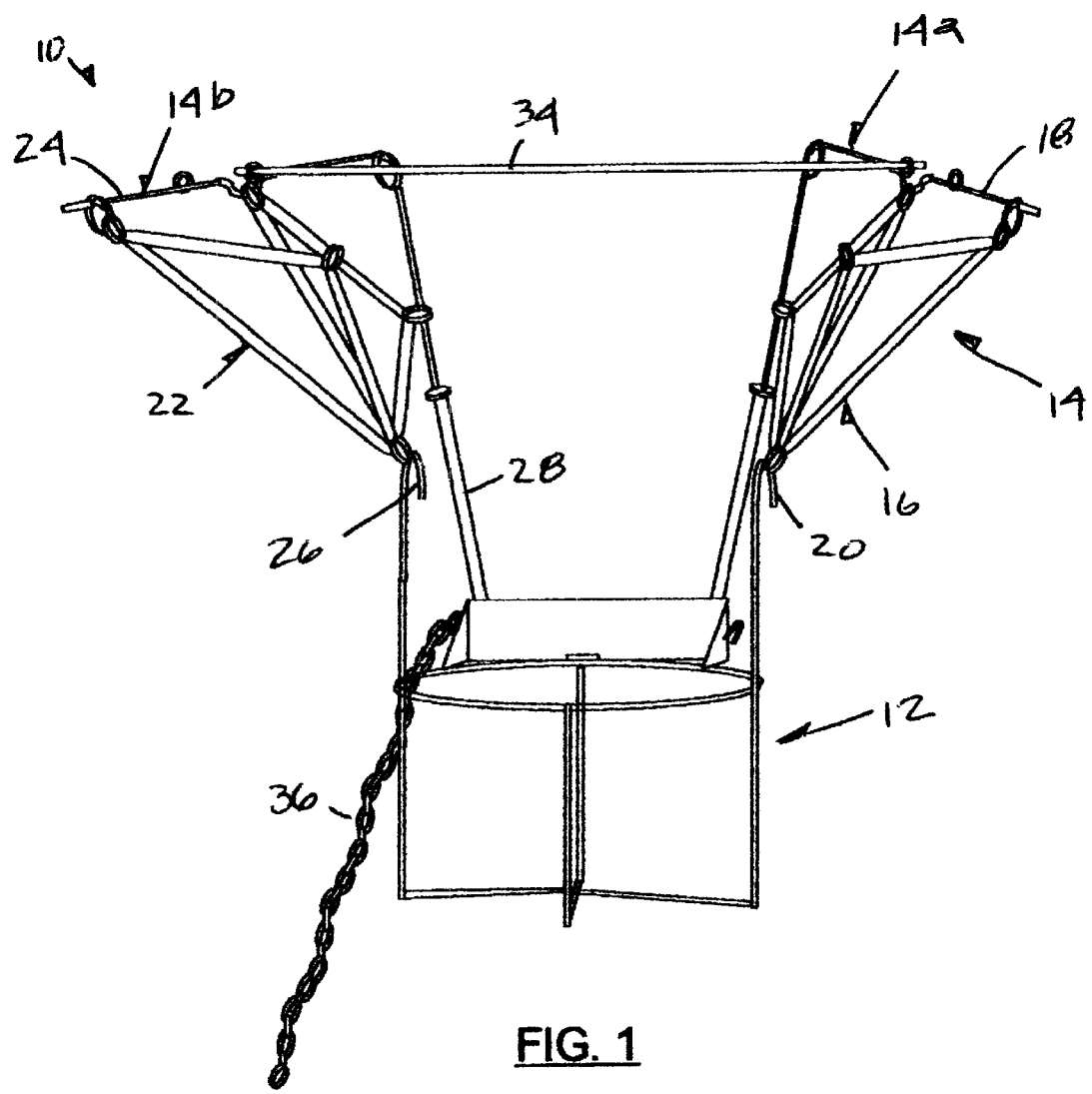
FIG. 1 is a schematic perspective view of an antler removal and collection device constructed in accordance with the principles discussed herein.

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described.

An antler removal and collection device 10 constructed in accordance with the principles of the present invention is shown in FIG. 1. The antler removal and collection device 10 includes an antlered animal attractant holder 12 adapted and constructed to hold an antlered animal attractant, such as food or salt. The antlered animal attractant holder 12 is configured to hold a standard 5-gallon bucket for containing feed, or a typical salt lick.

The device 10 also includes a flexible antler removal assembly 14 mounted in proximity with the antlered animal attractant holder 12. The flexible antler removal assembly 14 includes a first elastic antler removal element 16. The first elastic antler removal element 16 is mounted on the frame assembly 14a, which includes an upper arm 18 mounted above the antlered animal attractant holder 12, and a retaining hook 20 mounted below the upper arm 18.

The flexible antler removal assembly 14 also includes a second elastic antler removal element 22. The second elastic antler removal element 22 is mounted on the frame assembly 14b, which includes an upper arm 24 mounted above the antlered animal attractant holder 12, and a retaining hook 26 mounted below the upperarm 24.

Figure 2:
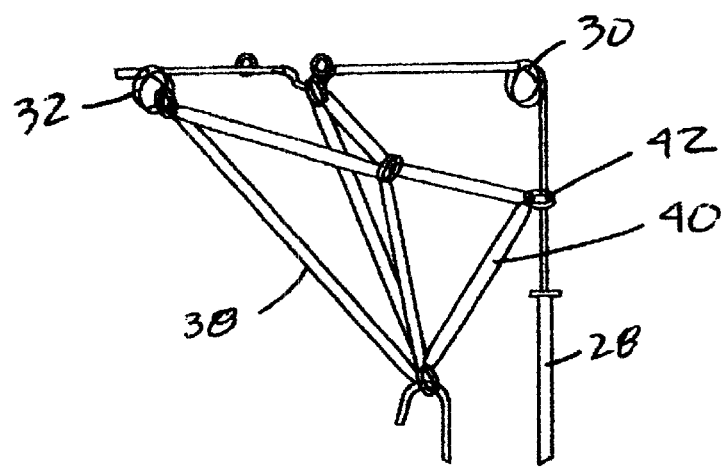
FIG. 2 is a detailed side view of a flexible collection assembly forming a portion of the antler removal and collection device illustrated in FIG. 1.
Figure 3:
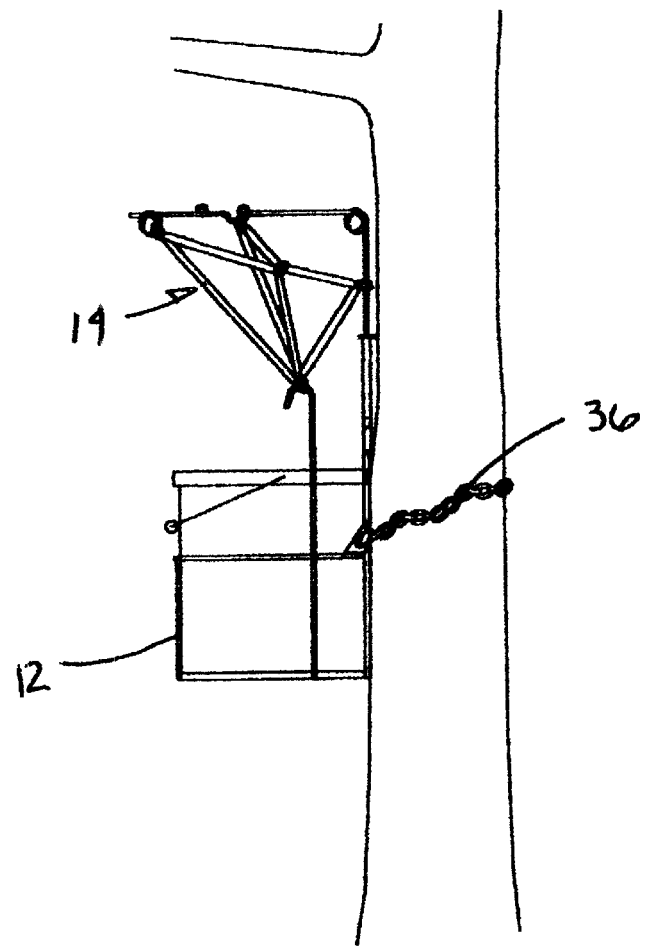
FIG. 3 is a schematic perspective view of an antler removal and collection device mounted to a tree.

As seen in FIGS. 1 and 2, the upper arms 18, 24 are provided as angled rod members inserted into tubular receiving elements 28 secured to the attractant holder 12. Loops 30 and 32 are provided to afford additional flexibility to the arms 18, 24. A threaded rod 34, which can be provided with a plastic sleeve for animal protection, is secured between the arms 18, 24 to adjustably maintain their angular relationship to one another. The ideal angle will depend upon the size of the antlers to be harvested, as will be appreciated by those of skill in the art. A chain 36 is secured to the attractant holder 12 to provide a machanism for attaching the device 10 to a generally vertical mounting surface such as a post or tree, as shown in FIG. 3. The attractant holder, hooks, tubular elements, and arms can be fabricated from any suitable material, such as metal or plastic. It has been found that sufficient strength and corrosion resistance are achieved by fabrication of these components from powder coated ³⁄₁₆" steel rod stock.

As shown in FIG. 2, the elastic antler removal element 16 can be configured as a pair of intersecting triangles. This is achieved by providing a first elastic loop 38 and a second elastic loop 40. The loops 38, 40 are first secured between the upper arm 18 and the hook 20, then stretched and clipped together as shown with clips 42. The loops 38, 40 are standard tire chain retention straps, such as those available from Pioneer Supply Company and Laclede Chain Company, with the clips 42 being standard clips supplied therewith. The loops can be provided as standard passenger car straps or truck straps, depending upon the size of the antlers to be harvested and the animals on which they occur.

Figure 4:
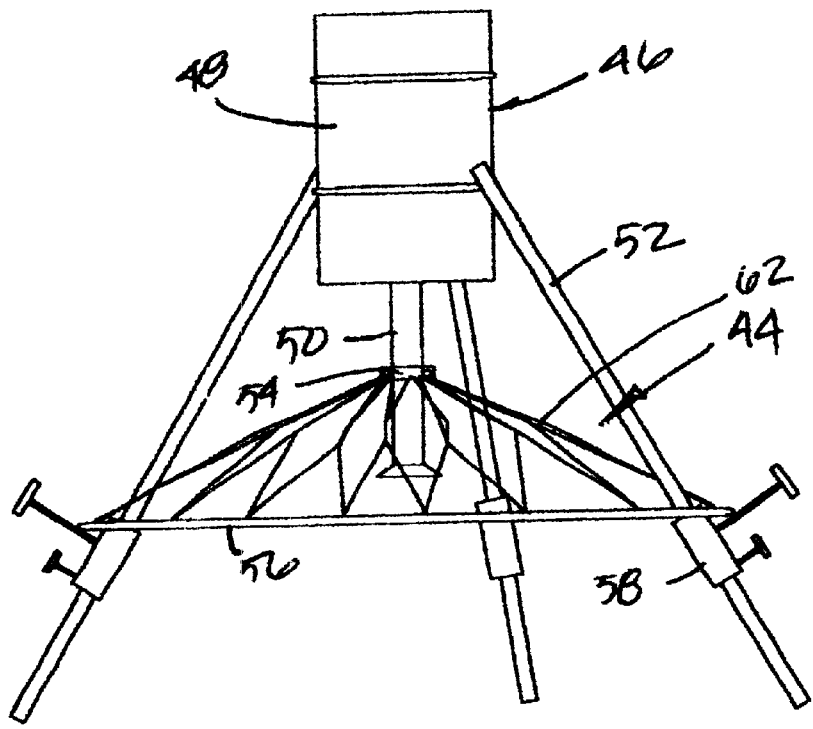
FIG. 4 is a schematic perspective view of an alternative embodiment of an antler removal and collection device constructed in accordance with the principles discussed herein.
Figure 5:
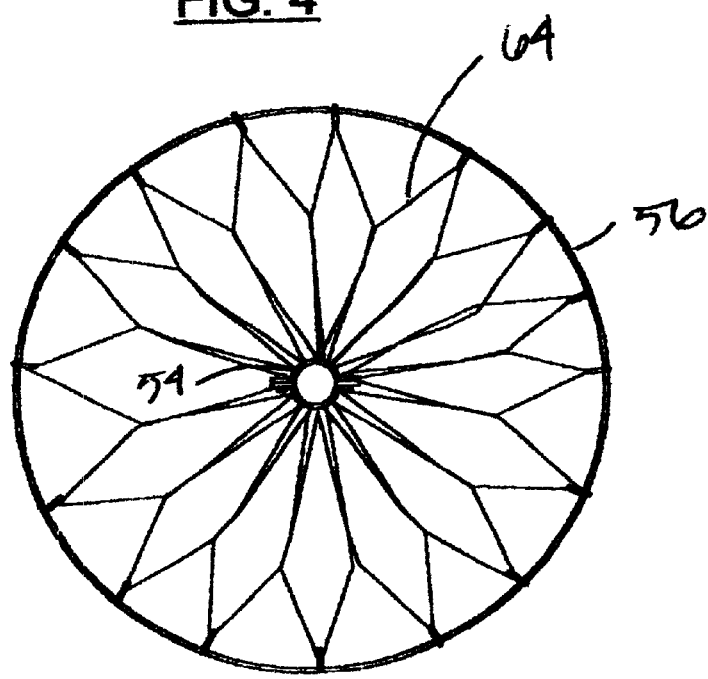
FIG. 5 is a detailed plan view of a flexible collection assembly forming a portion of the antler removal and collection device illustrated in FIG. 4.

As shown in FIGS. 4 and 5, an antler removal and collection device 44 is adapted for connection to a feeder 46. The feeder 46 includes a feed holder 48 and a feed tube 50 supported on a tripod 52. The antler removal and collection device 44 includes a frame assembly having pair of generally concentric rings 54, 56. The first ring 54 is secured to the feed tube, while the second ring 56 rests upon mounting elements 58 secured to the legs of the tripod 52 via securing screws 60.

Figure 6:
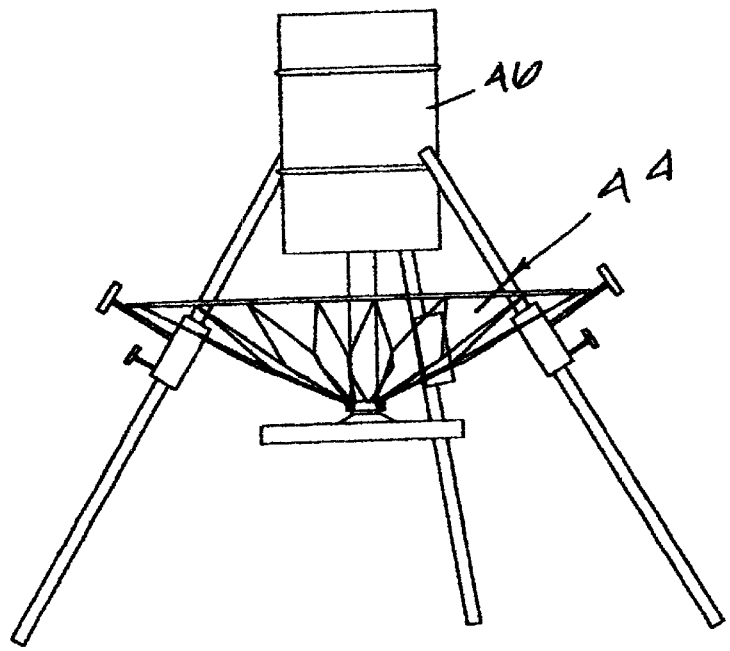
FIG. 6 is a schematic perspective view of an alternative embodiment of an antler removal and collection device constructed in accordance with the principles discussed herein.

Elastic antler removal elements 62, provided as a plurality of elastic strap members 64 connected between the rings 54, 56. In the illustrated embodiment, the elastic strap members are provided as tire chain straps as described hereinabove. In the illustrated embodiment, 16 such straps are employed although the precise number will depend upon the particular feeder. As shown in FIG. 6, the collection device 44 can be mounted in a "funnel" configuration, as opposed to the "umbrella" configuration of FIG. 4. of the frame assembly, or alternatively as a generally frustoconical net connected between the rings of the frame assembly. The ring 56 is fabricated from ½" or ⁹⁄₁₆" rod stock, and the ring 54 is fabricated from a pair of c-shaped clamps bolted together, similar to a standard pipe strap. Although illustrated with a tripod and ring configuration, the present invention is adapted to other applications, such as a square frame on a four-legged support, or a triangular frame.

Figure 7:
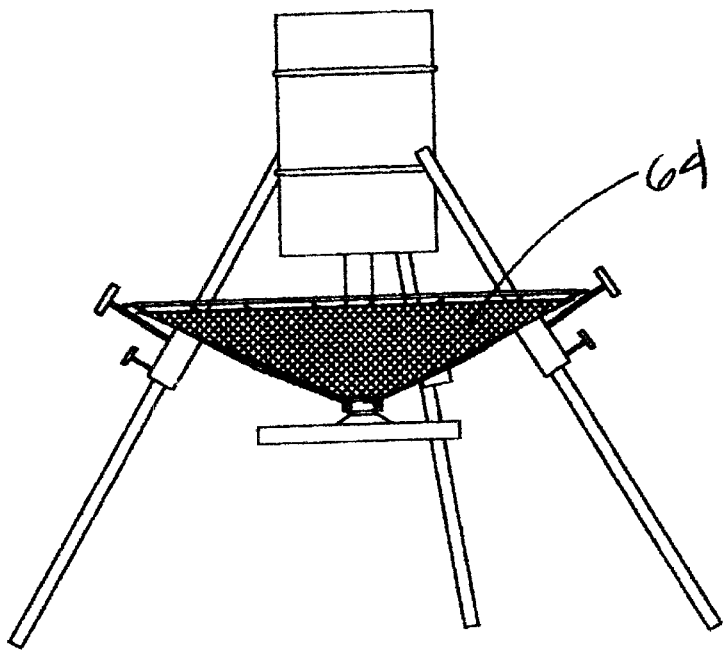
FIG. 7 is a schematic perspective view of an alternative embodiment of an antler removal and collection device constructed in accordance with the principles discussed herein.

As shown in FIG. 7, the elastic antler removal element can be provided as a net 64, such as a nylon mesh net.

Although the present invention has been described with reference to specific embodiments, those of skill in the art will recognize that changes may be made thereto without departing from the scope and spirit of the invention as defined by the appended claims.

What is claimed is:

1. An antler removal and collection device comprising the following:
   an antlered animal attractant holder adapted and constructed to hold an antlered animal attractant; and
   a flexible antler removal assembly mounted in proximity with the antlered animal attractant holder, the flexible antler removal assembly including at least one elastic antler removal element;
   whereby the at least one elastic antler removal element is adapted and constructed to exert sufficient force to remove antlers that are ready to be shed by animals coming into proximity with the antlered animal attractant, but insufficient force to trap the antlered animal in the flexible antler removal assembly.

2. An antler removal and collection device according to claim 1, wherein the flexible antler removal assembly comprises at least one frame assembly upon which the at least one elastic antler removal element is mounted.

3. An antler removal and collection device according to claim 2, wherein the at least one frame assembly comprises a pair of frame assemblies and a corresponding pair of elastic antler removal elements.

4. An antler removal and collection device according to claim 3, wherein each of the frame assemblies comprises the following:
   an upper arm mounted above the antlered animal attractant holder; and
   a retaining hook mounted below the upper arm.

5. An antler removal and collection device according to claim 4, wherein each of the elastic antler removal elements comprises a plurality of elastic strap members connected between the upper arm and retaining hooks of the frame assemblies.

6. An antler removal and collection device according to claim 2, wherein the frame assembly comprises a pair of generally concentric rings mounted to a feeding device.

7. An antler removal and collection device according to claim 6, wherein the elastic antler removal elements comprise a plurality of elastic strap members connected between the rings of the frame assembly.

8. An antler removal and collection device according to claim 6, wherein the elastic antler removal elements comprise a generally frustoconical net connected between the rings of the frame assembly.

9. An antler removal and collection device comprising the following:
   an antlered animal attractant holder adapted and constructed to hold an antlered animal attractant; and
   a flexible antler removal assembly mounted in proximity with the antlered animal attractant holder, the flexible antler removal assembly including at least one elastic antler removal element;
   whereby the at least one elastic antler removal element is configured as an elastic webbing adapted and constructed to exert sufficient force to remove antlers that are ready to be shed by animals coming into proximity with the antlered animal attractant, but insufficient force to trap the antlered animal in the flexible antler removal assembly.

10. An antler removal and collection device according to claim 9, wherein the flexible antler removal assembly comprises at least one frame assembly upon which the at least one elastic antler removal element is mounted.

11. An antler removal and collection device according to claim 10, wherein the at least one frame assembly comprises a pair of frame assemblies and a corresponding pair of elastic antler removal elements.

12. An antler removal and collection device according to claim 11, wherein each of the frame assemblies comprises the following:
   an upper arm mounted above the antlered animal attractant holder; and
   a retaining hook mounted below the upper arm.

13. An antler removal and collection device according to claim 12, wherein each of the elastic antler removal elements comprises a plurality of elastic strap members connected between the upper arm and retaining hooks of the frame assemblies.

14. An antler removal and collection device according to claim 10, wherein the frame assembly comprises a pair of generally concentric rings mounted to a feeding device.

15. An antler removal and collection device according to claim 14, wherein the elastic antler removal elements comprise a plurality of elastic strap members connected between the rings of the frame assembly.

16. An antler removal and collection device according to claim 14, wherein the elastic antler removal elements comprise a generally frustoconical net connected between the rings of the frame assembly.

17. A method for removing shed antlers from an antlered animal, the method comprising the following steps:
   placing antlered animal attractant is a holder;
   mounting a flexible antler removal assembly in proximity with the antlered animal attractant holder, the flexible antler removal assembly including at least one elastic antler removal element;
   attracting antlered animals into proximity with the at least one elastic antler removal element; and
   causing the at least one elastic antler removal to exert sufficient force to remove antlers that are ready to be shed by animals coming into proximity with the antlered animal attractant, but insufficient force to trap the antlered animal in the flexible antler removal assembly.

18. A method according to claim 17, wherein the step of providing a flexible antler removal assembly comprises providing at least one frame assembly upon which the at least one elastic antler removal element is mounted.

19. An antler removal and collection device according to claim 18, wherein the step of providing at least one frame assembly comprises providing a pair of frame assemblies and a corresponding pair of elastic antler removal elements, wherein each of the frame assemblies includes an upper arm mounted above the antlered animal attractant holder and a retaining hook mounted below the upper arm, and wherein each of the elastic antler removal elements comprises a plurality of elastic strap members connected between the upper arm and retaining hooks of the frame assemblies.

20. An antler removal and collection device according to claim 18, wherein the step of providing a frame assembly comprises a pair of generally concentric rings mounted to a feeding device, with the elastic antler removal elements comprising a plurality of elastic strap members connected between the rings of the frame assembly.

* * * * *

UNITED STATES PATENT AND TRADEMARK OFFICE
CERTIFICATE OF CORRECTION

PATENT NO. : 6,363,649 B1
DATED : April 2, 2002
INVENTOR(S) : Gary Lambert

It is certified that error appears in the above-identified patent and that said Letters Patent is hereby corrected as shown below:

<u>Title page,</u>
Item [22] Filed: Filed date should be -- January 25, 2001 --.

<u>Column 1,</u>
Line 43, "more" should be -- morel --.

Signed and Sealed this

Twenty-fourth Day of September, 2002

*Attest:*

*Attesting Officer*

JAMES E. ROGAN
*Director of the United States Patent and Trademark Office*